United States Patent [19]

Conner

[11] Patent Number: 4,966,441
[45] Date of Patent: Oct. 30, 1990

[54] HYBRID COLOR DISPLAY SYSTEM

[75] Inventor: Arlie R. Conner, Portland, Oreg.

[73] Assignee: In Focus Systems, Inc., Tualatin, Oreg.

[21] Appl. No.: 363,099

[22] Filed: Jun. 7, 1989

Related U.S. Application Data

[63] Continuation-in-part of Ser. No. 329,938, Mar. 28, 1989.

[51] Int. Cl.$^5$ ............................................. G02F 1/13
[52] U.S. Cl. .................................. 350/335; 350/337; 350/339 F
[58] Field of Search ..................... 350/335, 337, 339 F

[56] References Cited

U.S. PATENT DOCUMENTS

| | | | |
|---|---|---|---|
| 4,006,968 | 2/1977 | Ernstoff et al. | 350/339 F |
| 4,257,682 | 3/1981 | Suzuki et al. | 350/349 |
| 4,416,514 | 11/1983 | Plummer | 350/335 |
| 4,597,636 | 7/1986 | Hoshikawa | 350/334 |
| 4,610,507 | 9/1986 | Kamamori et al. | 350/335 |
| 4,651,148 | 3/1987 | Takeda et al. | 340/805 |
| 4,798,441 | 1/1989 | Van Raalte | 350/339 F X |
| 4,838,655 | 6/1989 | Hunahata et al. | 350/337 |
| 4,842,379 | 6/1989 | Oishi et al. | 350/335 X |
| 4,859,037 | 8/1989 | Iwashita et al. | 350/339 F |
| 4,877,309 | 10/1989 | Takamatsu | 350/337 |

FOREIGN PATENT DOCUMENTS

| | | |
|---|---|---|
| 50-110296 | 8/1975 | Japan . |
| 50-110297 | 8/1975 | Japan . |
| 53-55049 | 5/1978 | Japan . |
| 54-59162 | 5/1979 | Japan . |
| 55-159415 | 12/1980 | Japan . |
| 56-121076 | 9/1981 | Japan . |
| 56-140320 | 11/1981 | Japan . |
| 58-224376 | 12/1983 | Japan . |
| 59-189317 | 10/1984 | Japan . |
| 59-219719 | 12/1984 | Japan . |
| 0194426 | 10/1985 | Japan .................. 350/335 |
| 60-238815 | 11/1985 | Japan . |
| 61-100725 | 5/1986 | Japan . |
| 62-125328 | 6/1987 | Japan . |
| 62-164024 | 7/1987 | Japan . |
| 63-49736 | 3/1988 | Japan . |
| 63-144326 | 6/1988 | Japan . |
| 63-195624 | 8/1988 | Japan . |
| 63-234225 | 9/1988 | Japan . |
| 63-264731 | 11/1988 | Japan . |
| 63-286819 | 11/1988 | Japan . |
| 64-44417 | 2/1989 | Japan . |
| 2024443 | 1/1980 | United Kingdom ............ 350/339 F |

OTHER PUBLICATIONS

Heilmeier et al., "Guest–Host Interactions in Nematic Liquid Crystals, A New Electro-Optic Effect," Applied Physics Letters, Aug. 1, 1968, vol. 13, No. 3, pp. 91–92.

White et al., "New Absorptive Mode Reflective Liquid-Crystal Display Device," Journal of Applied Physics, vol. 45, No. 11, Nov., 1974, pp. 4718–4723.

Scheffer, Terry, "New Multicolor Liuid Crystal Displays That Use a Twisted Nematic Electo-Optical Cell," Journal of Applied Physics, vol. 44, No. 11, Nov., 1973, pp. 4799–4803.

(List continued on next page.)

*Primary Examiner*—Stanley D. Miller
*Assistant Examiner*—Huy K. Mai
*Attorney, Agent, or Firm*—Townsend & Townsend

[57] ABSTRACT

A color display system includes two colored LCD panels operated in conjunction with a colored filter. One of the LCDs may be a primary color, such as red, green or blue, and the other LCD may be its complement, i.e. cyan, magenta or yellow, respectively. The color filter may be in mosaic form and desirably comprises pixels of two subtractive primary colors that are chosen to cooperate with the colored panels to yield a full color display. The invention's use of only two stacked panels and two colored filter elements yields a number of performance and design advantages over prior art full color systems that must rely on three stacked panels or three colored filter elements.

15 Claims, 5 Drawing Sheets

OTHER PUBLICATIONS

Kotani, et al., "Effect of Various Parameters on Matrix Display of SBE-Liquid Crystal Cells," Japan Display '86, pp. 384-386.

Assouline et al., "Two-Color Liquid-Crystal Display," Electronics Letters, Nov. 18, 1971, vol. 7, No. 23, pp. 699-700.

Kawachi, et al., "Light Scatteering Chara cteristics in Nematic-Cholesteric Mixtures with Positive Dielectric Anisotropy", Japan Journal of Appl. Phy., vol. 17, No. 7, Jul., '78, pp. 1245-1250.

Uchida et al., "Bright Dichroic Guest-Host LCDs Without a Polarizer," Proceedings of the SID, vol. 22/1, 1981, pp. 41-46.

Yamagishi, et al., "A Multi-Colored Projection Display Using Nematic-Cholesteric Liquid Crystal," 1988 IEEE, pp. 204-207.

Mochizuki, et al., "New Nematic-Cholesteric LCD Using Hysteresis Behavior," Proceedings of the SID, 1985, vol. 26/4, pp. 243-248.

Sato, et al., "Novel Multicolor Liquid Crystal Display Without Color Filter," Japan Display '89, pp. 392-395.

Uchida, T., "Multicolored Liquid Crystal Displays," Optical Engineering, May/Jun. 1984, vol. 23, No. 3, pp. 247-252.

Schickel, et al., "Deformation of Nematic Liquid Crystals With Vertical Orientation in Electrical Fields," Applied Physics Letters, vol. 19, No. 10, Nov. 15, 1971, pp. 391-393.

Iijima, et al., "640×400 Pixels Multicolor STN-LCD Using Birefringence Effect," Japan Display '89, pp. 300-302.

IBM Corp., "Twisted Nematic Liquid Crystal Replacement for Overhead Transparency", IBM, vol. 29, No. 11, Apr. 1987.

FIG. 4  TRANSMISSION SPECTRUM BLUE MODE

FIG. 5  TRANSMISSION SPECTRUM YELLOW MODE

FIG. 6 TRANSMISSION SPECTRUM CYAN FILTER

FIG. 7 TRANSMISSION SPECTRUM MAGENTA FILTER

HYBRID COLOR DISPLAY SYSTEM

RELATED APPLICATION DATA

This application is a continuation-in-part of my co-pending application Ser. No. 07/329,938, filed Mar. 28, 1989.

FIELD OF THE INVENTION

The present invention relates to systems for optically displaying color images, and more particularly relates to a novel color display system that includes a plurality of stacked, light-transmissive panels operating in cooperation with a color mosaic filter.

BACKGROUND AND SUMMARY OF THE INVENTION

Much effort has been made in recent years to develop low power color displays. Such efforts have generally employed LCD panels in one of two configurations. In the first configuration, a plurality of differently colored LCD panels are stacked and illuminated with white light. As the light passes through the stacked layers, pixels in each panel act as controllable color filters, selectively coloring the light exiting the display.

While the stacked cell approach can provide a full color display, it has certain shortcomings. One is the requirement of three LCD panels. This large number both increases the cost of the display and reduces its light transmissivity. Furthermore, the stacking of cells often introduces serious parallax problems which severely limit the usable viewing angle.

The second approach uses only a single LCD panel, but uses it in conjunction with a mosaic color filter. The mosaic filter typically has a plurality of red, green and blue filter elements, each aligned with a pixel in the LCD panel. (The filter is often fabricated as an integral part of the LCD assembly.) By controlling the pixels in the LCD panel, the display can pass light through selected areas of the color mosaic filter.

While the color mosaic technique addresses certain shortcomings of the stacked panel approach, it introduces certain problems of its own. One is that brightness is limited because less than a third of the active area transmits light for any given color. Another is that pixel density must be increased by a factor of three to obtain the same resolution as the stacked cell approach. That is, to provide a color display with a horizontal resolution of 640 colored pixels, for example, the LCD panels must have 1920 pixels, 640 each of red, green and blue. This introduces fabrication problems that decrease yields and increase panel costs.

To address these shortcomings of the prior art, the present invention adopts a hybrid approach in which both stacked panels and color mosaic filters are employed. Preferably, only two stacked panels are employed, minimizing the problems conventionally associated with three panel embodiments. Similarly, only two color filter elements are used in the color mosaic filter, again minimizing the problems conventionally associated with the color mosaic approach. The filter colors are desirably selected from the subtractive primaries (cyan, magenta, yellow) so as to increase light transmission. The filter colors and the colors of the two LCD panels are selected so that the two technologies cooperate to provide a full color display.

The foregoing and additional features and advantages of the present invention will be more readily apparent from the following detailed description, which proceeds with reference to the accompanying drawings.

DETAILED DESCRIPTION

To provide an enabling disclosure without unduly lengthening this specification, applicant incorporates by reference the disclosures of U.S. Pat. Nos. 4,547,043, 4,549,174, 4,652,101, 4,709,990 and 4,763,993 which each certain fundamental concepts useful in the construction of a device according to the present invention.

Before proceeding, it may be helpful to first review certain principles of color optics. The primary light colors are generally considered to be red, green and blue. White light is composed of all three primaries. White light with red filtered therefrom (i.e. removed) is termed cyan; white light with green filtered therefrom is termed magenta; and white light with blue filtered therefrom is termed yellow. These latter colors, cyan, magenta and yellow, are sometimes termed subtractive primary colors, since they denote the absence of one of the primary colors.

Filters selectively attenuate (or "absorb") light of certain colors and pass light of other colors relatively unattenuated. A red filter, for example, attenuates blue and green light and lets red light pass. Similarly, a blue filter attenuates red and green light and lets blue light pass. Finally, a green filter attenuates red and blue light and lets green light pass. Filters of the primary colors thus subtract two primary colors and let the third pass.

Filters of the subtractive primary colors subtract one primary color and let the two others pass. For example, a cyan filter attenuates red light and lets blue and green light pass. Similarly, a magenta filter attenuates green light and lets blue and red light pass. Finally, a yellow filter attenuates blue light and lets green and red light pass.

These properties are summarized in Table I.

TABLE I

| Filter | Absorbs | Passes |
|--------|---------|--------|
| Red | Green, Blue | Red |
| Green | Red, Blue | Green |
| Blue | Red, Green | Blue |
| Yellow | Blue | Green, Red |
| Cyan | Red | Blue, Green |
| Magenta | Green | Blue, Red |

Again, although somewhat counter-intuitive, it should be remembered that a blue filter does not filter out blue light. It passes blue light and blocks light of other colors.

It should further be noted that the human eye is more sensitive to certain wavelengths of light than to others. The eye's response (termed "photopic" response) typically peaks at about 554 nanometers and diminishes to near negligible values around 400 and 700 nanometers.

For convenience of discussion, the optical spectrum is generally segregated into the red, green and blue portions by dividing lines at 500 and 600 nanometers. (For physiological reasons, a precise dividing line cannot be defined.) Using these boundaries, the human eye perceives 55% of the energy in white light from the green portion of the spectrum (500 to 600 nm.), 30% from the red portion (above 600 nm.), and only 15% from the blue portion (below 500 nm.). Perfect green, red and blue filters thus transmit 55%, 30% and 15% of white light, respectively (photopically). Since yellow, cyan and magenta are combinations of these colors, it can be seen that yellow, cyan and magenta filters transmit 85%, 70% and 45% of white light, respectively.

Figure 1:
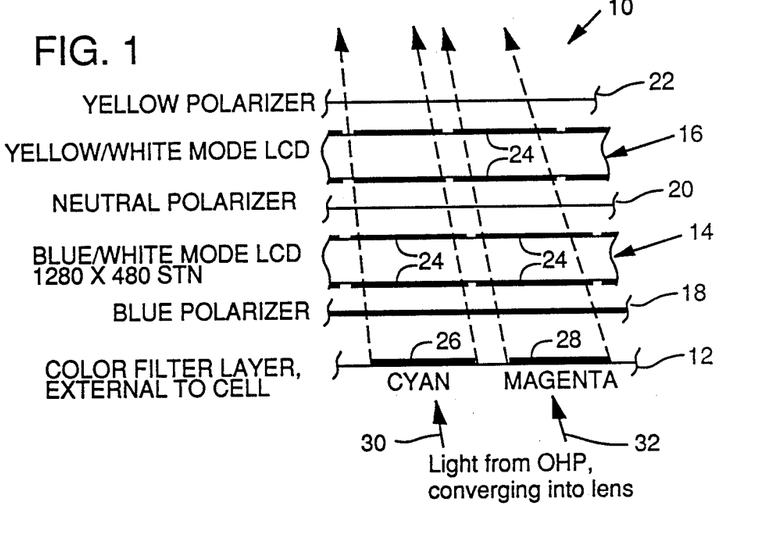
FIG. 1 is a schematic view of a color display subassembly according to one embodiment of the present invention.

Referring now to FIG. 1, a display device, or subassembly, 10 according to one embodiment of the present invention includes a color mosaic filter 12, two color LCD panels 14, 16, and three polarizers 18, 20, 22.

Panels 14, 16 used in the illustrated embodiment are supertwisted nematic LCD panels that are controllably colored by exploitation of the birefringence effect. The use of birefringence to control color in LCD panels is discussed in U.S. Pat. Nos. 3,876,287, 4,097,128, 4,127,322, 4,394,069, 4,759,612 and 4,786,146, the disclosures of which are incorporated by reference. Briefly, in birefringence color systems, light of different wavelengths is rotated differing amounts as it passes through the liquid crystal material. When the exiting light is analyzed by a polarizer, certain color components are oriented in a direction that passes through the polarizer, and other color components are oriented in directions that are attenuated or blocked. This selective filtering of the optical spectrum by the cooperating polarizers produces the color effect.

In the illustrated embodiment, the birefringent properties of the first panel 14 are "tuned" (by choosing the thickness (d) of the liquid crystal layer and its optical refractive index anistropy ($\Delta n$)) to rotate the polarization of incoming red and green light to a direction in which it is absorbed by the exiting polarizer when the panel is in its deselected (i.e. deenergized) state. The panel 14 and polarizers 18 and 20 thus act as a blue filter when the panel is deselected. When the panel is in its selected (i.e. energized) state, the liquid crystal molecules nearly align with the electric field, thereby reducing the effect of the twist so that all wavelengths of light pass through nearly unaffected, i.e. still white. (For expository convenience, panel 14 is sometimes called the "blue" panel and is said to controllably absorb red and green [i.e. yellow] light. It will be recognized, however, that this and panel 16 must be operated in conjunction with associated front and back polarizers to achieve the desired coloring effect.)

The illustrated second panel 16 is similarly tuned to operate as a yellow filter (i.e. absorbing blue) when in its deselected state and to pass all wavelengths of light (i.e. white light) when in its selected state. It is sometimes termed the "yellow" panel.

It may be noted that, unlike most prior art stacked panel displays, the illustrated embodiment includes one panel of a primary color (i.e. blue) and one panel of a subtractive primary color (i.e. yellow). Their cooperative relationship to yield a full color display is made possible by the color mosaic filter 12, as described below.

In the illustrated embodiment, the yellow panel 16 includes a plurality of individually controllable pixels regularly arrayed in a 640 by 480 matrix. (In FIG. 1, each pixel is illustrated by the pair of electrodes 24 that defines it.) The blue panel 14 includes twice as many pixels, arrayed in a 1280 by 480 matrix. The blue panel is cooperatively positioned with the yellow panel so that each pixel of the yellow panel is optically superimposed on two pixels of the blue panel.

Figures 2, 3:
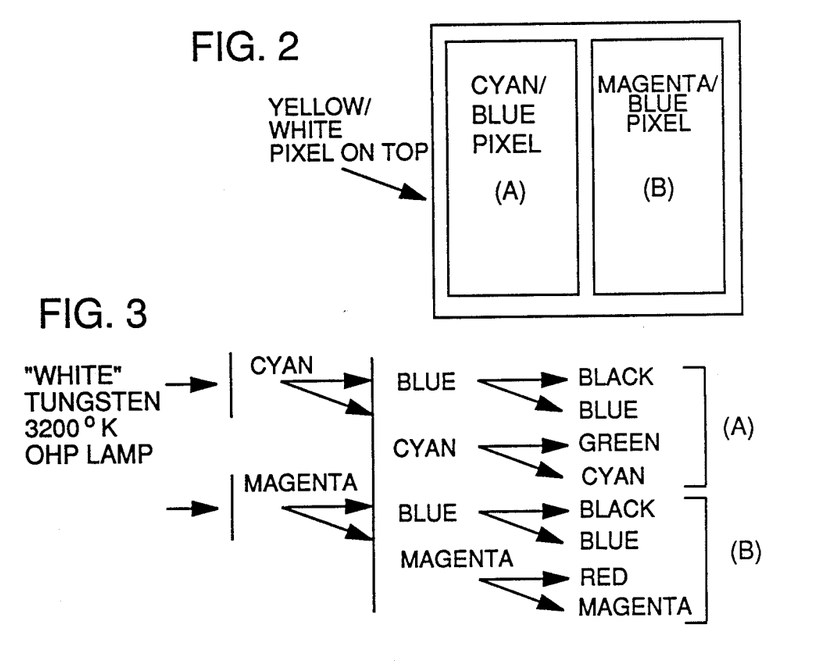
FIG. 2 is a schematic view illustrating correspondence between a single pixel in a yellow panel with two pixels in a blue panel and two pixels in a color mosaic filter in the display subassembly of FIG. 1.
FIG. 3 illustrates the selective coloring of white light by the display subassembly of FIG. 1.

The color mosaic filter 12 is comprised of a plurality of cyan and magenta filter elements, 26, 28 respectively, regularly arrayed in a 1280 by 480 matrix. The color mosaic filter is similarly cooperatively positioned with the blue and yellow panels 14, 16 so that each pixel of the filter is optically superimposed on one pixel of the blue panel, and each pair of pixels in the filter is optically superimposed on one pixel in the yellow panel. The above-described superimposition relationship is illustrated in FIG. 2.

The color mosaic filter 12 may be implemented in a number of ways. For example, it may comprise a dyed acetate or polyester substrate, aligned during fabrication with the other layers, or it may comprise the surface of one of the polarizer plates on which filter dyes are offset or screen printed.

The fabrication of color mosaic filters is more particularly detailed, inter alia, in U.S. Pat. Nos. 4,712,874, 4,770,525, 4,776,671, 4,773,737, 4,752,771, 4,690,511, 4,458,175 and 4,653,862, the disclosures of which are incorporated herein by reference.

In operation, all light passing through the display follows one of two different paths 30 or 32 (FIG. 1). The first path 30 is through a cyan filter element 26, the blue panel 14 and the yellow panel 16. The second path 32 is similar but starts with passage through a magenta filter element 28 and concludes by passing through the blue panel and the yellow panel.

Light following the first path 30 is first stripped of its red component (since the cyan mosaic filter element 26 attenuates red light). The remaining blue and green light next passes through the blue panel 14. If this panel is in its deselected state, it acts as a blue filter, passing only blue light. If this panel is in its selected state, it passes both the blue and green light.

The light exiting the blue panel 14 then enters the yellow panel 16. If the yellow panel is in its deselected state, it attenuates blue light, so passes no light if the blue panel was deselected, and passes only green light if the blue panel was selected. If the yellow panel is in its selected state, it passes all light, so passes blue light if the blue panel was deselected, and passes blue and green light (i.e. cyan light) if the blue panel was selected.

Light following the second path 32 is first stripped of its green component (since the magenta mosaic filter element 28 attenuates green light). The remaining red and blue light next passes through the blue panel 14. If this panel is in its deselected state, it acts as a blue filter, passing only blue light. If this panel is in its selected state, it passes both the blue and red light.

The light exiting the blue panel 14 then enter the yellow panel 16. If this yellow panel is in its deselected state, it attenuates blue light, so passes no light if the blue panel was deselected, and passes only red light if the blue panel was selected. If the yellow panel is in its selected state, it passes all light, so passes blue light if the blue panel was deselected, and passes blue and red light (magenta) if the blue panel was selected.

The colors resulting from these various combinations are illustrated in FIG. 3.

Each of the two paths 30, 32 can produce the colors black and blue. The double passage of blue is advantageous because most incandescent illumination has relatively less blue energy than energy of other colors. Thus, the passage of blue light through both paths acts to correct a color imbalance normally inherent with incandescent lighting. In particular, tungsten "white" or 3200° K is color corrected by this arrangement to 5600° K.

Neither of the paths 30 or 32 by themselves can produce yellow or white. However, the human eye can average adjoining cyan and magenta pixels to perceive white, and can average adjoining green and red pixels to perceive yellow. The average of the colors of two adjoining pixels is termed the color of a "super pixel," of which there are 640 across the width of the display. This arrangement thus can yield the full gamut of color.

Table II summarizes the foregoing discussion:

TABLE II

| After Filter Element | After Blue Panel | After Yellow Panel | Average |
|---|---|---|---|
| C | C (wh) | C (wh) | Wh |
| M | M (wh) | M (wh) | |
| C | C (wh) | G (yel) | Y |
| M | M (wh) | R (yel) | |
| C | C (wh) | C (wh) | C |
| M | B (b) | B (wh) | |
| C | C (wh) | G (yel) | G |
| M | B (b) | Blk (yel) | |
| C | B (b) | B (wh) | M |
| M | M (wh) | M (wh) | |
| C | B (b) | Blk (yel) | R |
| M | M (wh) | R (yel) | |
| C | B (b) | B (wh) | B |
| M | B (b) | B (wh) | |
| C | B (b) | Blk (yel) | Blk |
| M | B (b) | Blk (yel) | | where B is blue, Blk is black, C is cyan, G is green, M is magenta, R is red, W is white and Y is yellow, and the colors in parentheses indicate whether a panel pixel is in its while (selected) or colored (deselected) states.

The polarizers 18, 20, 22 used in the illustrated embodiment are needed to analyze the light passing through the liquid crystal panels 14, 16 in order to achieve perceptible contrast. In prior art display systems, the polarizers are usually neutral (i.e., dyed black by iodine). In the present invention, colored polarizers (which are "leaky") can be used in certain positions to pass more light, improving the brightness and allowing color balance improvements.

Panel 14 is illustrated as being blue when in its deselected state. Light entering it is polarized by an entrance polarizer 18. Normally, all colors of light orthogonal to the axis of polarizer 18 would be absorbed by the black dye of a conventional, neutral polarizer, resulting in an immediate loss of 50% of the light. This loss can be cut dramatically if the polarizer 18 is dyed blue. Such a polarizer still passes the white light parallel to the polarizer's axis, but additionally passes blue light orthogonal to its axis. This additional blue light is permitted to pass to the yellow panel 16 and ultimately contributes to the overall brightness of the resulting display, instead of being absorbed by the first polarizer as is normally the case. The losses normally associated with this first polarizer are thus cut by a third (radiometrically). Display brightness improves commensurately.

The same benefit can be achieved at the exiting end of the stacked assembly 10. Panel 16 is illustrated as being yellow in its deselected state. By dying the polarizer 22 adjacent thereto yellow, the red and green light that would normally be absorbed thereby is allowed to leak through, again improving display brightness.

In addition to the foregoing benefits, colored polarizers also ease the design requirements of the LCDs with which they are associated. While an LCD designer must normally be concerned about the performance of a panel across the entire spectrum, the use of a colored polarizer with the panel renders the performance at certain colors irrelevant. For example, in designing the blue panel 14, the designer need not worry about its performance in the selected and deselected states in the blue portion of the spectrum. The blue polarizer 18 will cause the panel to pass blue regardless of its state, so the designer can focus on optimizing performance in the green and red portions of the spectrum. Similarly with the yellow polarizer 22. Since this polarizer will cause the yellow panel 16 to pass green and red light regardless of its state, the designer can focus on optimizing performance of the panel in the blue portion of the spectrum.

Figure 4:
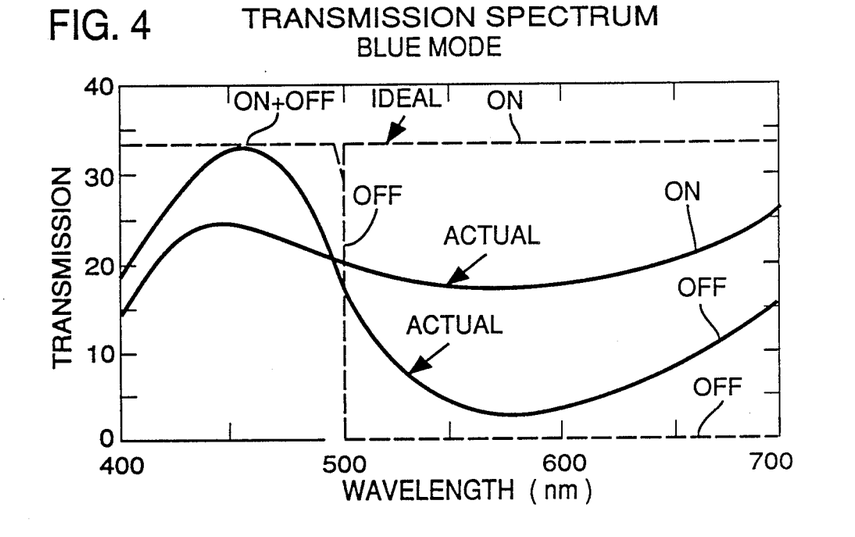
FIG. 4 is a spectral plot showing ideal and actual light transmission characteristics for a blue LCD panel used in the display subassembly of FIG. 1.
Figure 5:
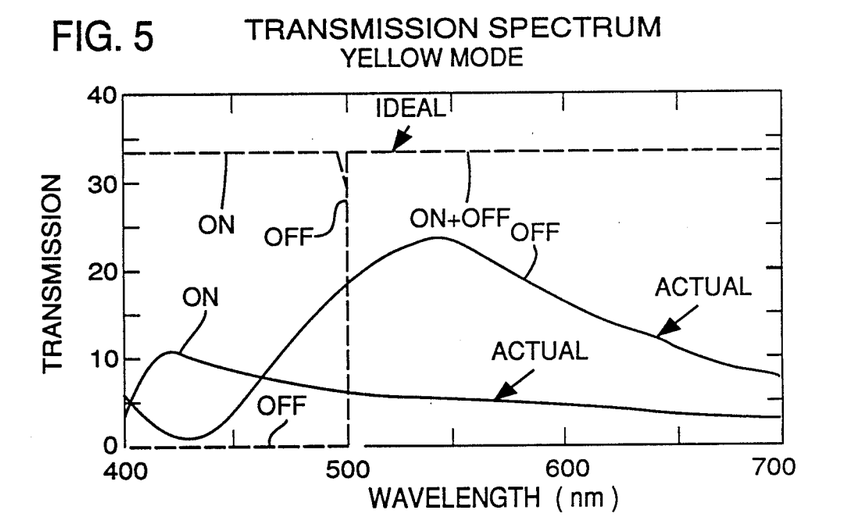
FIG. 5 is a spectral plot showing ideal and actual light transmission characteristics for a yellow LCD panel used in the display subassembly of FIG. 1.

Spectrophotometer plots showing the ideal and actual light transmission qualities of panels 14 and 16 (again, considered in conjunction with their associated polarizers) are provided in FIGS. 4 and 5, respectively. Panels suitable for use as panels 14, 16 are available from Kyocera of Kyoto, Japan or may be fabricated using known techniques.

Figure 6:
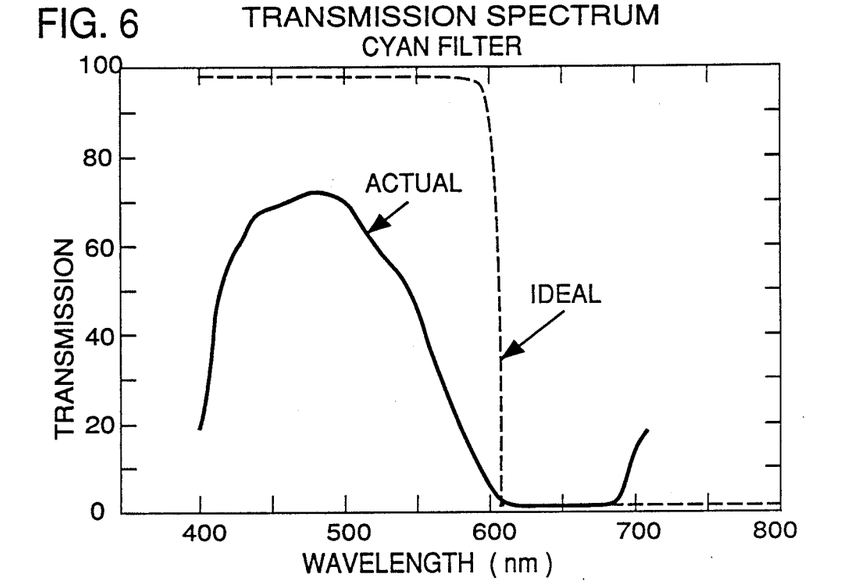
FIG. 6 is a spectral plot showing ideal and actual light transmission characteristics of cyan filter elements used in a color mosaic filter in the display subassembly of FIG. 1.
Figure 7:
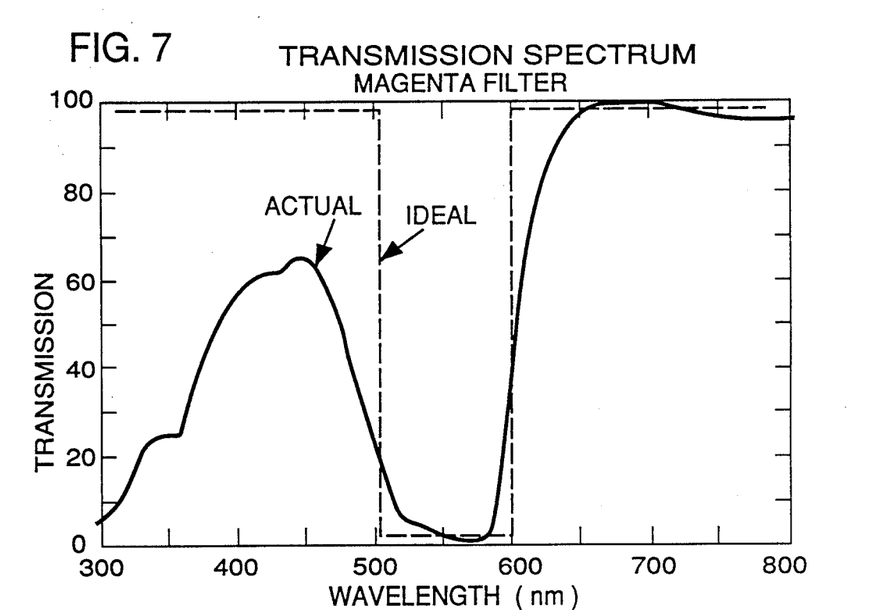
FIG. 7 is a spectral plot showing ideal and actual light transmission characteristics of magenta filter elements used in a color mosaic filter in the display subassembly of FIG. 1.

Spectrophotometer plots showing the ideal and actual light transmission qualities of cyan and magenta filter elements 26, 28 are provided in FIGS. 6 and 7. Suitable filter materials or dyes are available from Crompton & Knowles, Brewer Science, Kodak Wratten, and Lee Colortran International.

Figure 8:
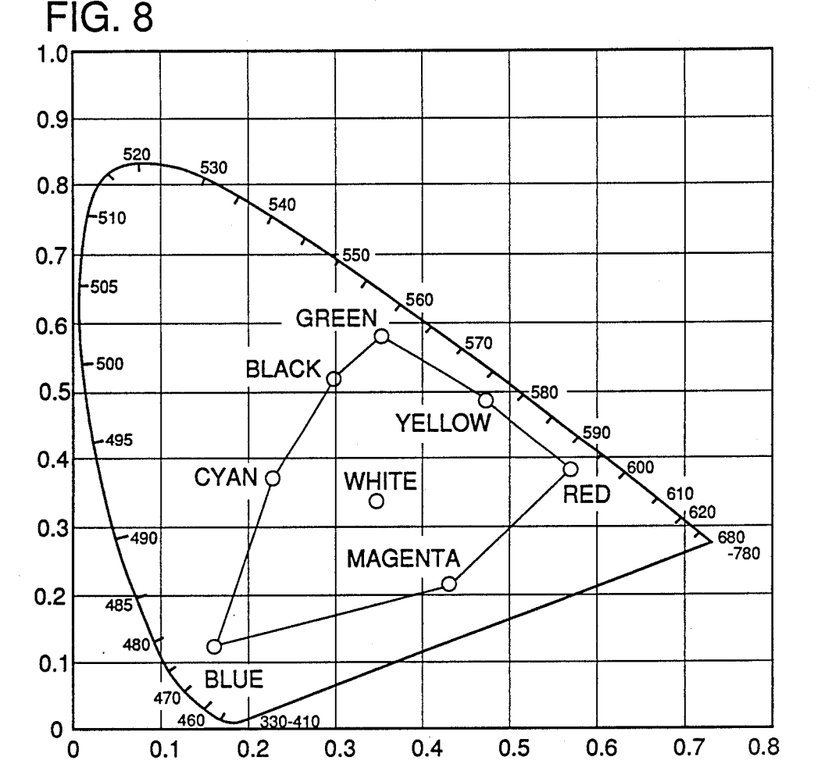
FIG. 8 is a chromaticity diagram illustrating the color gamut achieved with the display subassembly of FIG. 1.

As can be seen from the foregoing curves, neither the passage of light of the desired colors nor the attenuation of light of undesired colors is perfect in the actual panels and filters. However, the resulting effect is more than adequate to provide saturated colors throughout the human visual area. A chromaticity diagram illustrating the color gamut resulting from these imperfect elements (using color illumination) is shown in FIG. 8.

The foregoing discussion has described only one of many possible combinations of panel colors and mosaic filter colors. Others can readily be devised. Generally speaking, the preferred embodiments are characterized as follows:

the first panel has 2N pixels that pass either all colors, or only primary color C;
the second panel has N pixels that pass either all colors, or only a color subtractive primary (A+B);
the color mosaic filter has N pixels that pass the color subtractive primary (A+C), and N more pixels that pass the color subtractive primary (B+C); (where A, B and C are assigned from the primary colors red, green and blue).

Thus, other embodiments include one in which the filter elements are colored magenta and yellow, and the panels are colored red and cyan; and a second in which the filter elements are colored cyan and yellow, and the panels are colored green and magenta.

One advantage of the present invention is this flexibility it offers in possible arrangements. If one of these embodiments seems unworkable, a design can be optimized about another one. For example, if it is found that a suitable cyan filter cannot be obtained, then a design that does not require a cyan filter can be adopted instead.

As noted earlier, the illustrated embodiment is advantageous due to the color correction it offers with incandescent light. However, these other embodiments have their own advantages. The embodiment with magenta and yellow filter elements, for example, can advantageously be used to color compensate fluorescent light, which is typically weak in the red portion of the spectrum.

Figures 9, 10:
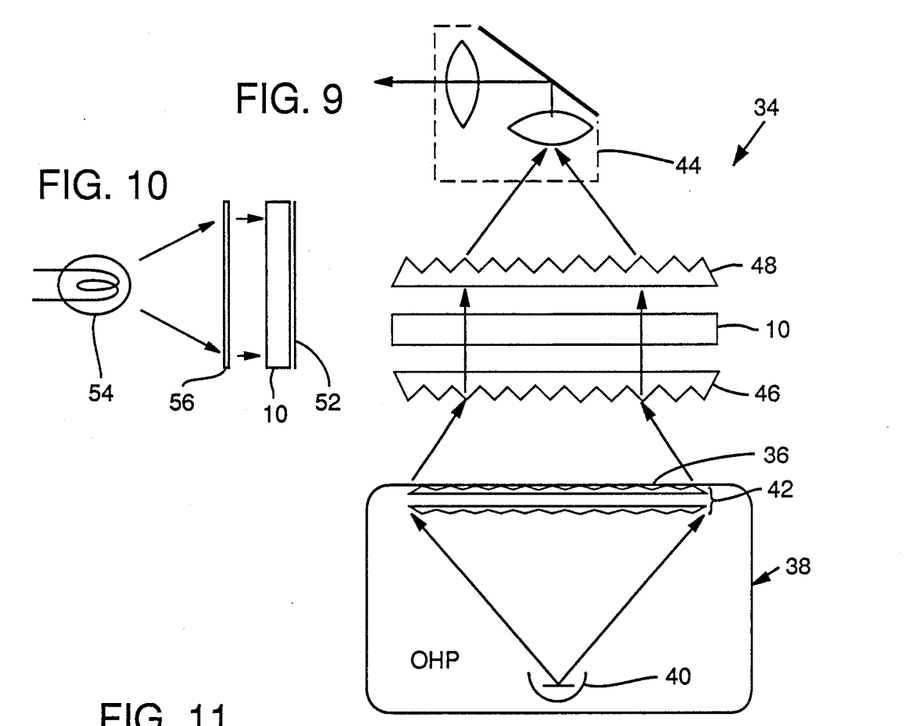
FIG. 9 is a schematic illustration of a first application of the present invention.
FIG. 10 is a schematic illustration of a second application of the present invention.

Referring now to FIG. 9, in a first application 34 of the present invention, the display subassembly 10 is positioned on the transparent projection surface 36 of a conventional overhead projector 38. Such projectors typically include an illumination bulb 40 and a Fresnel lens 42 under the projection surface to produce light beams that pass through a transparency and converge onto a projection lens assembly 44. (Due to the short focal length and high power required of lens 42, this lens is often formed by cementing two or more lower powered Fresnel lenses together.)

When display subassembly 10 is used in the FIG. 9 application, it is desirable to provide a Fresnel lens 46 to collimate the converging light from the projection surface prior to illumination of the display subassembly. The light exiting the subassembly is then refocused by a lens 48 (which is also desirably in Fresnel form) onto the projection lens assembly 44. (Lens 48 here serves the same purpose as the Fresnel lens provided under the projection surface of the projector in the projector's normal operation, namely to focus light towards the projection lens assembly 44.)

In another embodiment, no auxiliary Fresnel lenses are used. Instead, the pixels on the various layers of the display subassembly 10 are spaced with different pitches so that the pixels align in proper registration with the converging light from the projector's built-in Fresnel lenses 44. This arrangement of pixels is shown in FIG. 1.

A second application 50 of the display assembly of the present invention is as a backlit screen for a computer or the like. In this application, shown in FIG. 10, the assembly 10 is illuminated with collimated light, and a translucent light dispersing material 52, such as a ground glass plate or a commercially available diffusion material (i.e. Rolux film manufactured by Rosco of Port Chester N.Y.) is mounted adjacent the yellow polarizer 22 to display the resulting color image. The collimated excitation light can be provided from a relatively low wattage bulb 54 in conjunction with a thin lens 56.

Figure 11:
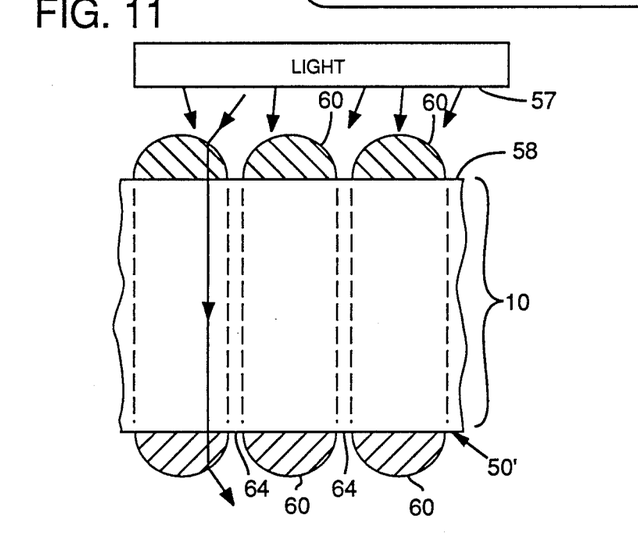
FIG. 11 is a schematic illustration of a variation of the FIG. 10 system.

In a related embodiment 50', shown in FIG. 11, a direct view display may be illuminated by a fluorescent light panel 57. In such embodiment, the display subassembly 10 is fabricated with an entrance plate 58 on which are formed a plurality of microlenses 60, one aligned to each pixel. Light incident on one of microlenses 60, regardless of its orientation, is directed normal to the plane of the display subassembly 10 and thus passes through the pixels of the component layers in the proper alignment.

The same arrangement may be used on the exiting side of the display. In this case, collimated light exiting the subassembly 10 is dispersed by microlenses 62 which permit the color image to be viewed from a wide range of angles without parallax effects. The interstitial areas 64 between the lenses may be colored black to minimize stray light and to improve perceived contrast. Alternatively, a simple light dispersing medium such as the ground glass plate 52 shown in FIG. 10 can be used.

Figure 12:
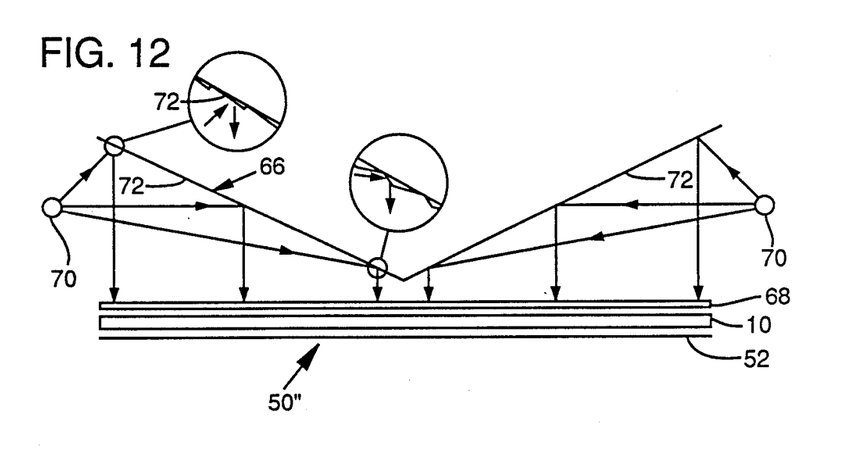
FIG. 12 is a schematic illustration of another variation of the FIG. 10 system.

In still a further variation 50'' of the direct view application of FIG. 10, the light can be collimated by a novel arrangement employing a parabolic mirror 66 (desirably in Fresnel form) and a micro-venetian blind material 68. As shown in FIG. 12, this embodiment is illuminated by a pair of linear light sources, such as fluorescent bulbs 70. These bulbs illuminate a generally flat mirrored surface 72 that has facets arranged to provide one axis of collimation. The angles of the facets vary with placement on the surface to simulate a sectioned parabolic reflector. Light reflected from this mirrored surface is substantially collimated. However, to remove any stray off-axis light, a micro-venetian blind material 68, such as Light Control Film marketed by 3M Corp, is desirably placed between the mirror and the display subassembly. This material is a thin plastic film containing closely spaced black microlouvers to absorb light misaligned with respect to the louvers. By this arrangement, a very compact and efficient display can be provided.

From the foregoing description, it will be recognized that the present invention solves many of the problems and deficiencies associated with prior art color display technologies. In addition to addressing the parallax and brightness problems noted earlier, the present invention offers a number of other advantages. One is the color compensation that corrects for the excessive red energy output from incandescent illumination sources. Another is a simplification that can be made in the display's drive circuitry due to the fact that the blue panel requires data at only twice the nominal shift clock frequency, instead of three-times as required with conventional three color filter displays. This 2X relation is easier to implement in digital logic than the 3X required in the prior art. Furthermore, the mosaic color filter can be fabricated independently of the polarizers and the panels, permitting its independent optimization. Its use of only two colors reduces the area on the filter dedicated to a black matrix that typically separates the constituent filter pixels, further increasing display brightness. Finally, the blue and yellow panels used in the illustrated embodiment are well developed designs that are based on well understood technology.

Having described and illustrated the principles of my invention with reference to a preferred embodiment and several variations thereon, it should be apparent that the invention can be modified in arrangement and detail without departing from such principles. For example, while the display subassembly has been described as including single supertwisted liquid crystal panels, other types, such as double supertwisted panels or panels embodying other technologies, can alternatively be used. Similarly, while the color mosaic filter has been described as comprising a plurality of pixels, in other embodiments a conventional color stripe arrangement may be used instead. Similarly, while the display subassembly has been described as including three polarizers, two LCD panels and one color mosaic filter, in other embodiments of the invention, additional optical components can also be used. For example, it is sometimes desirable to include retardation films adjacent the panels in order to tune the range of birefringence effects to desired frequencies. In other embodiments, if any of the LCD birefringence colors are not ideal, some attenuation of specific light frequencies might enhance the color gamut and overall contrast. Thus, two polarizers might be used together or a weak color filter compensator (i.e. a conventional gelatin filter) might be added.

Still further, while the illustrated embodiment has shown a system in which entering light can pass through two distinct light paths within a single display subassembly, in alternative embodiments these two light paths can be defined by two separate assemblies. For example, a color projection system may comprise first and second projectors, with the first using a display subassembly having a solid magenta filter, a blue panel and a yellow panel; and the second using a display subassembly having a solid cyan filter, a blue panel and a yellow panel. The images from these two projectors can be superimposed and projected onto a common screen.

In view of these and the wide variety of other embodiments to which the principles of my invention may be applied, it should be recognized that the illustrated embodiments are to be considered illustrative only and not as limiting the scope of the invention. Instead, I claim as my invention all such modifications as may come within the scope and spirit of the following claims and equivalents thereto.

I claim:

1. A color display system comprising a color mosaic filter stacked with first and second color liquid crystal display panels, wherein the first liquid crystal display panel defines a uniform array of pixels of a first size, and the second liquid crystal display panel defines a uniform array of pixels of a second size larger than the first, and the first and second panels are stacked so that each of the pixels of the second panel is optically superimposed over a plurality of pixels in the first panel.

2. The display of claim 1 in which the color mosaic filter comprises a plurality of pixels and in which the pixels of the color mosaic filter are aligned with the pixels of the first color liquid crystal display panel.

3. The display of claim 2 in which the color mosaic filter and the first liquid crystal panel each has twice as many pixels as the second liquid crystal display panel.

4. The display of claim 1 in which the color mosaic filter has pixels of first and second colors, the pixels of the first color attenuating a first primary light color and the pixels of the second color attenuating a second primary light color.

5. The display of claim 4 in which the first liquid crystal display panel is comprised of pixels selectively operable to attenuate light of both the first and second primary light colors and the second liquid crystal display panel is comprised of pixels selectively operable to attenuate light of a third primary light color.

6. The display of claim 1 in which:
the first and second color liquid crystal display panels operate in conjunction with front and rear polarizers associated therewith;
a polarizer intermediate said panels is dyed black; and
another of said other polarizers is dyed a color other than black.

7. A hybrid color display comprising:
first, second and third polarizers;
a first liquid crystal display panel disposed between the first and second polarizers and comprising a plurality of pixels each electronically switchable between first and second states, each pixel in its first state attenuating transmission of light of a first color that is not so attenuated when in its second state;
a second liquid crystal display panel disposed between the second and third polarizers and comprising a plurality of pixels each electronically switchable between first and second states, each pixel in its first state attenuating transmission of light of a second color that is not so attenuated when in its second state, said second color being different than the first color of the first panel;
a mosaic color filter having a plurality of first and second elements, the first elements attenuating transmission of light of a third color and the second elements attenuating transmission of light of a fourth color;
wherein:
the first color, attenuated by the first panel, comprises two primary colors;
the second color, attenuated by the second panel, is the primary color not attenuated by the first panel;
the third color, attenuated by the first filter elements, is one of the two primary colors not attenuated by the second panel; and
the fourth color, attenuated by the second filter elements, is the other of said two primary colors not attenuated by the second panel.

8. The display of claim 7 wherein:
the first color is yellow;
the second color is blue;
the third color is red; and
the fourth color is green.

9. The display of claim 7 wherein:
the first color is magenta;
the second color is green;
the third color is red; and
the fourth color is blue.

10. The display of claim 7 wherein:
the first color is cyan;
the second color is red;
the third color is green; and
the fourth color is blue.

11. The display of claim 7 wherein the first panel has twice as many pixels as the second panel and is positioned relative to the second so that each pixel of the second panel is in optical alignment with two of the pixels of the first panel.

12. The display of claim 7 wherein the first polarizer is dyed the second color.

13. The display of claim 7 wherein the third polarizer is dyed the first color.

14. The display of claim 7 wherein the center-to-center pixel spacing on one of said panels is larger than said spacing on the other of said panels to facilitate operation with focused non-collimated light sources.

15. A color display system comprising a color mosaic filter stacked with first and second LCD panels;
   the mosaic filter including alternating pixels of first and second different colors selected from the subtractive primary colors: yellow, cyan, magenta;
   the first and second LCDs comprising first and second supertwisted nematic birefringent liquid crystal display panels, each of said panels exhibiting a total twist angle greater than or equal to 180 degrees and less than 360 degrees, each of said panels having a plurality of electronically operable pixels, the birefringence of the pixels in the first panel being tuned to the subtractive primary color not included in the pixels of the color mosaic filter, the birefringence of the pixels in the second panel being tuned to a primary color complementary to the subtractive primary color of the first panel.

* * * * *